June 17, 1969
C. J. ROGERS, SR
3,450,947
ELECTRICAL SAFETY CIRCUIT
Filed May 1, 1967
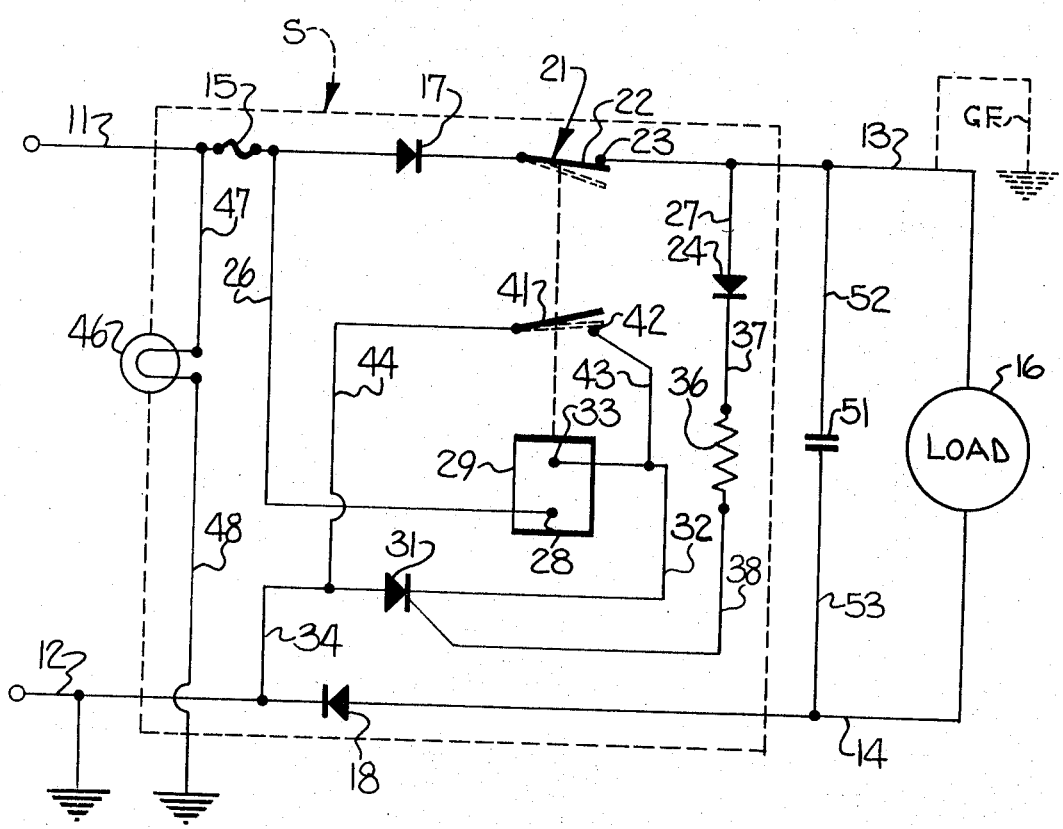
INVENTOR:
CHARLES J. ROGERS, SR.
BY *J. Russell Foster*
ATTORNEY

United States Patent Office 3,450,947
Patented June 17, 1969

3,450,947
ELECTRICAL SAFETY CIRCUIT
Charles J. Rogers, Sr., Charleston, S.C., assignor to C. J. Rogers Enterprises, Inc., Charleston, S.C., a corporation of South Carolina
Filed May 1, 1967, Ser. No. 635,024
Int. Cl. H02h 1/02
U.S. Cl. 317—18                                        9 Claims

ABSTRACT OF THE DISCLOSURE

An electrical safety circuit for connecting a pair of load conductors to a pair of line conductors connected to a source of A.C. power wherein one of the line conductors is grounded. A pair of half-wave rectifiers connected in the line conductors between the source and the load so as to block one half-wave of the A.C. power source from the load. A ground fault sensing means connected to a switching means in the line conductor circuit for disconnecting the source from the load upon a ground fault condition.

---

This invention relates to an electrical safety circuit and more particularly to a safety circuit for an electrical distribution system for eliminating perosnal injury and property damage from body contact or a ground fault on a load conductor.

A common type of electrical power distribution system in use today particularly in residences, workshops, etc., comprises what is referred to as a "two wire" system which utilizes a pair of line conductors connected to a suitable source of A.C. power. One of these line conductors is grounded, the other ungrounded conductor being generally referred to as a "hot" conductor. In any electrical distribution system and specifically in such a two wire system, there is always the risk of injury to property and person due to inadvertent contact by a person with the ungrounded conductor or the presence of a ground fault on this conductor. Although elaborate safety precautions are generally taken to protect against such injury and damage, they continue to occur by reason of the inherent limitations of such systems. The losses from electrical fires continues to mount from year to year and the growing use of electrical devices particularly in residences produces a continuous increase annually in the number of casualties from electrical shock. Such electrical shock hazards and resulting injuries are particularly prevalent in households, home workshops, etc., where constant use is made of such electrical devices. Furthermore, the use of such appliances by untrained persons such as housewives, children, and the like who necessarily are confined in close proximity with such electrical distribution systems magnifies this problem.

Many prior art devices have been proposed for disconnecting current carrying or load conductors from their associated source of power when there is contact by a person or a ground fault on the system in an effort to prevent such injury or damage. These devices in general are designed to respond quickly upon personal contact or the occurrence of ground fault so as to avoid such injury and damage. An example of such a device is shown in the Sharp U.S. Patent No. 2,079,636. Unfortunately, such persent day circuit interrupters still do not operate with the necessary speed for absolute safety and the component parts of such devices are prone to fail or deteriorate with use to further increase the length of time required for response. As a result, such devices have not been put into widespread use and the current safety codes generally specifies protective devices which more positively limit the voltage and current levels to a safe value in various electrical distribution systems.

As another effort to increase the safety of such systems, the use of low resistance grounds by means of which the frames of appliances such as washing machines, ranges, power tools, etc., are grounded is becoming more widespread. As is well known, such grounds offer a grounded path for current when a short appears in such appliances thereby aiding in preventing injury to individuals. However, while ground conductors are generally available on such devices and while wall receptacles are now generally required to have grounded third wires, full advantages of such ground protection is generally not utilized. In many cases, the ground wire on such devices is improperly connected and/or the receptacle third wire ground conductor is not properly grounded. The frequent failure to use the ground wire on such devices is quite commonplate particularly in household installations of appliances where the value of such a ground wire is not fully appreciated or simply through carelessness.

Accordingly, a primary object of this invention is to provide a new and novel safety circuit for an electrical distribution system of the type commonly found in residences, workshops, buildings, and the like which eliminates personal injury and property damage from exposure to live conductors.

Another object of this invention is to provide a new and novel electrical safety circuit which responds with such speed upon bodily contact with a conductor in the load circuit in an electrical distribution system that any possibility of bodily harm is eliminated.

Still another object of this invention is to provide a new and novel electrical safety circuit for an electrical distribution system which limits the magnitude of current in a ground fault on a load circuit substantially below an absolutely safe level to eliminate any risk of bodily injury or property damage.

Still another object of this invention is to provide a new and novel electrical safety circuit for two wire electrical distribution system which utilizes a minimum of inexpensive electrical components in a highly simplified circuit that is readily miniaturized, which is foolproof in operation so as to eliminate the possibility of failure, which is adaptable to outdoor use and which is characterized by a high load carrying capacity.

A still further object of this invention is to provide a new and novel safety circuit for a two wire electrical distribution system which indicates correct polarity and which positively indicates the presence of a proper connection of a protective conductor to ground.

Still another object of this invention is to provide a new and novel ground indicating arrangement for an electrical distribution system which utilizes visual ground indicating means so as to indicate the presence of a properly connected ground conductor.

Other objects and advantages of the invention will become apparent from the following description taken in connection with the accompanying drawing.

In general, the objects of the invention and related objects are accomplished by the provision of an electrical safety circuit for connecting a pair of load conductors arranged to be connected to a load to a pair of line conductors connected to an associated source of A.C. power in a two wire system in which one of the line conductors is grounded. The circuit includes a pair of half-wave rectifiers and means for connecting each of the line conductors to one of the load conductors in series relationship with one of the half-wave rectifiers for connecting the load to the source of A.C. power. The pair of half-wave rectifiers define therebetween on one side thereof a load circuit including the load conductors and load and are arranged to be connected to the line conductors in oppositely directed relationship for normally blocking one half-wave of the A.C. power which is applied to the load. Normally closed switching means are provided for disconnecting the load from the source of A.C. power and normally nonresponsive circuit means including a half-wave rectifier are connected to the load circuit and to the source of A.C. power. The normally nonresponsive circuit means is arranged to permit the normally blocked half-wave of the source of A.C. power to bypass the half-wave rectifier connected to the ungrounded line conductor through the half-wave rectifier in the circuit means upon the presence of a ground fault on the load circuit whereby the normally nonresponsive circuit means responds to actuate the switching means to disconnect the load from the source of A.C. power.

The novel features which are believed to be characteristic of the invention are set forth with particularity with the appended claims. The invention itself, however, both as to its organization and method of operation may be best understood by reference to the following description taken in conjunction with the accompanying drawing in which:

The drawing is a schematic wiring diagram illustrating the electrical safety circuit of the invention.

Referring now to the drawing, there is shown an electrical safety circuit constructed in accordance with the invention and in which the circuit components are shown enclosed within the broken lines designated generally by the letter S. It should be understood that the electrical safety circuit S may be suitably enclosed in a housing or the like for easy connection to line conductors 11, 12 and load conductors 13, 14 arranged to be connected to a load 16 such as an appliance, lighting, a motor or the like.

The line conductors 11, 12 are arranged to be connected to an associated source of A.C. power (not shown) which is of the "two wire" type wherein line conductor 12 is a grounded conductor and line conductor 11 a "hot" or ungrounded conductor. The two load conductors 13, 14 and the load 16 comprise what is referred to hereinafter as a load circuit. For protection, a fuse 15 may be included in the circuit S and connected to the line conductor 11 as shown.

The electrical safety circuit S includes a pair of half-wave rectifiers 17, 18 and means are provided for connecting each of the line conductors 11, 12 to one of the load conductors 13, 14 through one of the half-wave rectifiers 17, 18 respectively to thereby connect the load 16 to the source of A.C. power. The pair of half-wave rectifiers 17, 18 are arranged in the circuit S to be connected to the line conductors 11, 12 in oppositely directed relationship so as to normally block one half-wave of the source of A.C. power which is applied to the load 16 through the load conductors 13, 14. As a result of the oppositely directed relationship of the half-wave rectifiers 17, 18, unidirectional, half-wave power is applied to the load 16. The conductors 11, 12 form a typical two wire electrical distribution system, the line conductor 12 being grounded, so that the typical line voltage of approximately 120 volts A.C. on such a two wire system is rectified through the half-wave rectifiers 17, 18 to apply a reduced voltage of approximately 85 volts to the load 16.

Normally closed switching means, designated generally by the numeral 21, are provided in the electrical safety circuit S for disconnecting the load 16 from the source of A.C. power. More specifically, a normally closed contactor 22 is provided between the half-wave rectifier 17 and the load conductor 13, the contactor 22 being arranged to engage contact 23 in the closed solid line position as shown.

The electrical safety circuit S includes normally non-responsive circuit means which include a half-wave rectifier 24 connected to the load circuit and to the source of A.C. power as described hereinafter. More specifically, the normally non-responsive circuit means comprise first circuit means which includes a conductor 26 connected at one end to the ungrounded line conductor 11 and at the other end to one terminal 28 of a relay coil 29 associated in the well-known manner with the switching means 21. The first circuit means also includes a normally open switch 31 connected by means of conductor 32 to the other terminal 33 of the relay coil 29 as shown. The other side of the switch 31 is connected by means of conductor 34 to the ungrounded line conductor 12 on the opposite side of the half-wave rectifier 18 from the load conductor 14. In the illustrated embodiment, the normally open switch 31 is a silicon controlled rectifier or SCR. The silicon controlled rectifier 31 or SCR is a commercially available electrical device which includes a gate and is normally nonconductive. However, when the SCR is activated by a relatively low current, it becomes conductive as is well known.

The normally non-responsive circuit means also includes second circuit means for connecting the half-wave rectifier 24 to the load circuit and to the normally open switch or SCR 31. As referred to above, the half-wave rectifier 24 is connected on one side by means of the conductor 27 to the load conductor 13 and on the other side to one side of a resistor 36 by means of conductor 37. The other side of the resistor 36 is conected by means of conductor 38 to the gate of the SCR 31.

The normally nonresponsive circuit means includes third circuit means or a "holding circuit" for maintaining the normally nonresponsive circuit means in the responsive condition during the presence of a ground fault designated by the letters GF in the drawing on the load circuit formed by the load conductors 13, 14 and the load 16. As is well known, a ground fault GF will occur from the contact of a bare portion with one of the load conductors 13, 14 by a person whose body is grounded, by a direct contact of a load conductor 13, 14 with ground, or by a circuit to ground from the load 16 such as would occur as a result of a short in the windings of a motor load 16 assuming the motor frame is in contact with the ground. The holding circuit or third circuit means includes normally open switch means such as a normally open contactor 41 arranged to move from the solid line to the dotted line position of the drawing into contact making engagement with a contact 42 connected by means of conductor 43 to conductor 32 and the terminal 33 of the relay coil 29. The other side of the contactor 41 is connected by means of conductor 44 to conductor 34 as shown. In the preferred arrangement, the contactor 41 is arranged to operate simultaneously with the contactor 22 under the actuation of the relay coil 29 so that the movement of the normally closed contactor 22 to the open dotted line position of the drawing moves the normally open contactor 41 into a closed position in contact making engagement with the contact 42.

In the normal operation of the circuit of the drawing, the switching means 21 is in the solid line position shown therein with the contactor 22 in contact making engagement with the contact 23 so that half-wave power due to the rectification of the half-wave rectifiers 17, 18 is applied to the load 16. Upon the presence of a ground fault GF on the load circuit such as on load conductor 13, the normally blocked half-wave of the source of A.C. power bypasses the half-wave rectifier 17 and current flows through conductor 27, half-wave rectifier 24, conductor 37, resistor 36, conductor 38 to the gate of SCR 31, through conductor 32, relay coil 29, conductor 26, to the line conductor 11. This current flow through the half-wave rectifier 24 renders the SCR 31 conductive in the well-known manner so that half-wave A.C. power is initially applied to the relay coil 29 from the line conductor 12, conductor 34, SCR 31, conductor 32, relay coil 29, conductor 26 to line conductor 11. Upon energization of the relay coil 29, the normally closed contactor 22 is moved to the dotted line position of the drawing interrupting the load circuit and disconnecting the ground fault GF from the circuit. Since contactor 41 moves simultaneously with contactor 22, it also moves to the dotted line position of the drawing into contact making engagement with the contact 42 establishing a holding circuit whereupon full wave A.C. power is applied to the relay coil 29 from the line conductors 11, 12 through conductor 26, relay coil 29, conductor 43, contactor 41, and conductors 44, 34. Thus, the load circuit is maintained in the interrupted condition until the ground fault GF is removed.

Another feature of the electrical safety circuit of the invention is the provision of visual ground indicating means such as a neon bulb 46 connected at one side by means of conductor 47 to line conductor 11 and at the other side by means of conductor 48 to a suitable ground. The ground to which conductor 48 is connected is that typical additional ground conductor commonly associated with two wire systems utilizing ungrounded and grounded conductors 11, 12. When the light 46 is illuminated, there is positive indication as to the existence of a proper connection to ground in not only the safety circuit of the invention but in other electrical devices such as appliances, motors, etc., connected to a source of power where the housings, frames, etc., are arranged to be grounded for protection in the well-known manner.

As explained above, the voltage applied to the load 16 during normal operation of the circuit S of the invention is less than that of the voltage across the line conductors 11, 12 due to half-wave rectification resulting from the use of the half-wave rectifiers 17, 18. The effectiveness of the circuit S is not reduced by this lower voltage as it is only necessary to use load devices of higher power ratings such as larger wattage lamps, motors or higher power ratings, and the like. However, it may be desired to increase the voltage applied to the load 16 and this may be accomplished in the noval arrangement of the invention whereby a capacitor 51 is connected across load conductors 13, 14 by means of conductors 52, 53 respectively. By the use of the capacitor 51, the voltage builds up in the capacitor 51 during the half-wave power flow and during the period of time when the half-wave power is normally blocked, the capacitor 51 discharges to provide what, in essence, is full-wave voltage across the load 16 approaching closely the line voltage across the line conductors 11, 12.

It can be seen that there has been provided with the novel arrangement of the invention an electrical safety circuit in which the opening of the load circuit under ground fault conditions is accomplished in a far shorter period of time than with present-day devices. Not only is the actuation of the load circuit disconnecting means or switching means 21 positive and foolproof in operation but the response time is approximately .008 second or lower. Furthermore, the fault current flowing in the third circuit means including the half-wave rectifier 24 is permitted to rise only to an extremely low, positively safe value before the SCR 31 is rendered conductive. Such fault current may be in the area of 2 milliamps or less. The safety circuit S of the invention lends itself readily to miniaturization being highly compact and light weight in construction and is capable of being utilized with high current drawing loads. Furthermore, the safety circuit S of the invention is readily adapted to outdoor use and is unusually effective in completely eliminating bodily injury and property damage of the type resulting from the inherent hazards of electrical circuits.

Having thus described the invention, what is claimed is:

1. An electrical safety circuit for connecting a pair of load conductors arranged to be connected to a load to a pair of line conductors connected to an associated source of A.C. power and wherein one of said line conductors is grounded comprising, in combination, a pair of half-wave rectifiers, means for connecting each of said line conductors to one of said load conductors in series relationship with one of said half-wave rectifiers to thereby connect said load to said source of A.C. power, said pair of half-wave rectifiers defining therebetween on one side thereof a load circuit including said load conductors and said load, said pair of half-wave rectifiers being arranged to be connected to said line conductors in oppositely directed relationship for normally blocking one half-wave of said source of A.C. power applied to said load, normally closed switching means for disconnecting said load from said source of A.C. power, normally nonresponsive circuit means including a half-wave rectifier connected to said load circuit and to said source of A.C. power for actuating said normally closed switching means, said normally non-responsive circuit means being arranged to permit the normally blocked half-wave of said source of A.C. power to bypass the half-wave rectifiers connected to said ungrounded line conductor through said half-wave rectifier in said normally nonresponsive circuit means upon the presence of a ground fault on said load circuit whereby said circuit normally nonresponsive circuit means responds to actuate said switching means and disconnect said load from said source of A.C. power.

2. An electrical safety circuit in accordance with claim 1 wherein said normally nonresponsive circuit means includes a holding circuit for maintaing said normally nonresponsive circuit means in the responsive condition during the presence of said ground fault on said load circuit.

3. An electrical safety circuit in accordance with claim 1 wherein said normally nonresponsive circuit means includes first circuit means including a relay coil operatively connected to said switching means and a normally open switch for connecting said relay coil to said source of A.C. power, second circuit means for connecting said half-wave rectifier to said load circuit and to said normally open switch whereby said normally blocked half-wave operatively conditions said normally open switch to connect said relay coil to said source of A.C. power for actuation of said switching means.

4. An electrical safety circuit in accordance with claim 3 wherein said normally open switch comprises an SCR having a gate, said second circuit means being arranged to connect said load circuit to said SCR gate through said half-wave rectifier, said first circuit means including said SCR and said relay coil connected in series relationship with each other and with said line conductors whereby said normally blocked power half-wave in said second circuit means energizes said gate to operatively condition said SCR to connect said relay coil to said source of A.C. power for actuation of said switching means.

5. An electrical safety circuit in accordance with claim 4 including third circuit means for connecting said relay coil directly to said source of A.C. power, said third circuit means including normally open switching means operatively associated with said relay coil whereby connection of said relay coil to said source of A.C. power by said second circuit means closes said normally open switching means in said third circuit means to hold said relay coil in connection with said source of A.C. power through said third circuit means.

6. An electrical safety circuit for connecting a pair of load conductors arranged to be connected to a load to a pair of line conductors connected to an associated source of A.C. power and wherein one of said line conductors is grounded comprising, in combination, a pair of half-wave rectifiers, means for connecting each of said line conductors to one of said load conductors in series relationship with one of said half-wave rectifiers to thereby connect said load to said source of A.C. power, said pair of half-wave rectifiers defining therebetween and on one side thereof a load circuit including said load conductors and said load, said pair of half-wave rectifiers being arranged to be connected to said line conductors in oppositely directed relationship for normally blocking one half-wave with said source of A.C. power applied to said load, normally closed switching means in said load circuit for disconnecting said load from said source of A.C.

power, first circuit means including a relay coil operatively connected to said normally closed switching means in said load circuit and an SCR having a gate connected in series relationship therewith for connecting said relay coil to said source of A.C. power, second circuit means including a half-wave rectifier for connecting said load circuit to the gate of said SCR whereby upon the presence of a ground fault on said load circuit said normally blocked power half-wave bypasses said half-wave rectifier connected to said ungrounded line conductor and operatively conditions said SCR to connect said relay coil to said source of A.C. power for actuation of said switching means, third circuit means including normally open switching means for connecting said relay coil directly to said source of A.C. power, said normally open switching means in said third circuit means being arranged for actuation simultaneously with said normally closed switching means in said load circuit whereby connection of said relay coil to said source of A.C. power by said second circuit means simultaneously actuates both of said switching means to interrupt said load circuit upon the presence of a ground fault thereon and to hold said relay coil in connection with said source of A.C. power.

7. An electrical safety circuit in accordance with claim 1 including visual indicating means connected to said ungrounded line conductor and to an associated ground for polarizing said electrical safety circuit and for indicating the existence of a proper ground connection in said circuit.

8. An electrical safety circuit in accordance with claim 1 wherein said visual indicating means comprises a light source.

9. An electrical safety circuit in accordance with claim 1 including a capacitor connected across said load conductors, said capacitor being arranged to provide a discharge voltage across said line conductors during the blocking of said half-wave by said pair of half-wave rectifiers to provide an equivalent full-wave voltage across said load.

References Cited

UNITED STATES PATENTS

| | | | |
|---|---|---|---|
| 2,815,446 | 12/1957 | Coombs | 317—31 X |
| 3,242,382 | 3/1966 | Rogers | 317—18 |
| 3,335,325 | 8/1967 | Elpers | 317—31 |
| 3,382,409 | 5/1968 | Assow et al. | 317—31 X |

JOHN F. COUCH, *Primary Examiner.*

J. D. TRAMMELL, *Assistant Examiner.*

U.S. Cl. X.R.

317—31, 33; 340—255